United States Patent
Alexander, Jr. et al.

(10) Patent No.: US 6,178,171 B1
(45) Date of Patent: Jan. 23, 2001

(54) ROUTE SWITCHING MECHANISMS FOR SOURCE-ROUTED ATM NETWORKS

(75) Inventors: Cedell Adam Alexander, Jr., Durham; Brahmanand Gorti, Cary; Matthew Blaze Squire, Raleigh, all of NC (US)

(73) Assignee: International Business Machines Corporation, Armonk, NY (US)

(*) Notice: Under 35 U.S.C. 154(b), the term of this patent shall be extended for 0 days.

(21) Appl. No.: 08/977,459

(22) Filed: Nov. 24, 1997

(51) Int. Cl.[7] ................................................. H04L 12/28
(52) U.S. Cl. ............................................ 370/395; 370/469
(58) Field of Search .................................. 370/396, 395, 370/389, 401, 402, 403, 404, 465, 466, 467, 469, 352

(56) References Cited

U.S. PATENT DOCUMENTS

| | | | |
|---|---|---|---|
| 4,621,362 | 11/1986 | Sy ............................................ | 370/88 |
| 4,901,312 | 2/1990 | Hui et al. ............................. | 370/85.12 |
| 5,251,213 | 10/1993 | Videlock et al. ................... | 370/85.12 |
| 5,327,431 | 7/1994 | Heske et al. ......................... | 370/85.5 |
| 5,392,399 | 2/1995 | Gilbrech ............................... | 395/200 |
| 5,444,692 | 8/1995 | Basso et al. ........................... | 370/13 |
| 5,581,552 | * 12/1996 | Civanlar et al. ..................... | 370/396 |
| 5,600,644 | * 2/1997 | Chang et al. ........................ | 370/404 |
| 5,617,540 | * 4/1997 | Civanlar et al. ..................... | 709/227 |
| 5,777,994 | * 7/1998 | Takihiro et al. ..................... | 370/395 |
| 5,812,552 | * 9/1998 | Arora et al. ......................... | 370/401 |

OTHER PUBLICATIONS

The ATM Forum Technical Committe, Multi–Protocol Over ATM Version 1.0, AF–MPOA–0087.000 (Jul., 1997).

\* cited by examiner

*Primary Examiner*—Ajit Patel
*Assistant Examiner*—Brian Nguyen
(74) *Attorney, Agent, or Firm*—Barry S. Newberger; Winstead, Sechrest & Minick; Daniel E. McConnell

(57) ABSTRACT

A method is implemented to enable networks employing source-route bridging to participate in route switched, Asynchronous Transfer Mode (ATM), networks. Such source-routed networks, for example, Token-Ring LANs, incorporate an end-to-end route description in the data packets transmitted by the source station. The end-to-end route description is contained in a Route Information Field (RIF). The method implemented herein associates an RIF with the ATM address corresponding to a destination station. This permits the source-route bridged network to exploit the efficiencies of layer-2 connections and the high-speed switching characteristics of the ATM network.

18 Claims, 7 Drawing Sheets

FIG. 1 (Prior Art)

| 7 | APPLICATION LAYER | PROVIDES A MEANS FOR APPLICATION PROCESS TO COMMUNICATE WITH ONE ANOTHER THROUGH THE OSI SYSTEM. CONTAINS MANAGEMENT FUNCTIONS TO SUPPORT DISTRIBUTED APPLICATIONS. |
|---|---|---|
| 6 | PRESENTATION LAYER | PROVIDES REPRESENTATION OF INFORMATION TO APPLICATION LAYERS IN A WAY THAT PRESERVES THE MEANING WHILE RESOLVING ANY DIFFERENCES IN FORMAT AND DATA REPRESENTATION BETWEEN THE APPLICATION SYSTEMS. |
| 5 | SESSION LAYER | PROVIDES THE MEANS NECESSARY TO COORDINATE DIALOGUE BETWEEN PRESENTATION ENTITIES. |
| 4 | TRANSPORT LAYER | PROVIDE END-TO-END CONTROL TO ALLOW FOR ERROR RECOVERY AND DETECTION TO THE HIGHER LAYERS. |
| 3 | NETWORK LAYER | ESTABLISHES, MAINTAINS, AND TERMINATES NETWORK CONNECTIONS BETWEEN END SYSTEMS. RESPONSIBLE FOR CONTROLLING THE FLOW OF DATA TO THE NETWORK. |
| 2 | LINK LAYER | PROVIDES SYNCHRONIZATION AND ERROR CONTROL FOR INFORMATION TRANSMITTED OVER THE PHYSICAL LINK. |
| 1 | PHYSICAL LAYER | PROVIDES ELECTRICAL, MECHANICAL, FUNCTIONAL, AND PROCEDURAL CHARACTERISTICS REQUIRED FOR THE PHYSICAL LINK. |

ROUTE SWITCHING MECHANISMS FOR SOURCE-ROUTED ATM NETWORKS

CROSS REFERENCE TO RELATED APPLICATIONS

This Application for patent is related to the following application for patent assigned to a common assignee:
NEXT HOP RESOLUTION PROTOCOL CUT-THROUGH TO LANS, Ser. No. 08/968,354 filed Nov. 12, 1997 (RA9-97-068)
This cross-referenced application is hereby incorporated by reference into this Application as though fully set forth herein.

TECHNICAL FIELD

The present invention relates in general to data processing networks, and in particular to methods for source-route bridged networks to participate in route switched networks.

BACKGROUND INFORMATION

Asynchronous Transfer Mode (ATM) is an emerging network technology that is designed to transport information between communicating stations in a point-to-point fashion. The interest in ATM is its promise of high bandwidths and quality of service. ATM is a connection oriented architecture, in contrast to network architectures that are structured to broadcast data from the source to the destination. In ATM, the source negotiates a connected path to the destination before it proceeds to transmit its information to the recipient. ATM protocols (or "rules," usually implemented in software) define the communications necessary to establish the connection. An ATM attached device has an ATM address in addition to any other network addresses it might have, depending on the particular ATM configuration within which it is incorporated. Some possible configurations will be described subsequently. Once a connection is established, the source station transmits its traffic only to the destination.

In contrast to connection oriented architectures are broadcast networks. In these, data is sent from a source station to a destination station by broadcasting it to all addresses where the recipient plucks it off the network while the other stations on the network ignore traffic not bound for them. Broadcast architectures provide one motivation for structuring a "network" as a set of interconnected subnetworks or "subnets."

In a large network, the proliferation of broadcast packets would overwhelm the network. Although a particular network may start out as a freestanding Local Area Network (LAN), eventually end-station users will probably want to avail themselves of the services available on other networks, and look to connect "their network" with other "networks." When this occurs, it is intuitive, as well as more precise, to view the resulting network structure as a set of subnets within a larger network, for example, an "internetwork." However, a station on one internetworking subnet that wishes to communicate with a destination on another subnet can only do so if there is connectivity between the subnet in which the source resides and the subnet in which the destination resides.

Communications methodologies between subnets are usually termed "layer-3" protocols. This refers to the layered architecture networking model of the International Standards Organization (ISO). This model is illustrated in FIG. 1. Layer-3 may sometimes be referred to as the "network" layer, and is equivalent to the "internetworking" layer in the TCP/IP model.

Connectivity between layer-3 subnets is provided by a device termed a "router." When a source station on one layer-3 subnet wishes to communicate with a destination station on another layer-3 subnet, it broadcasts the data in the usual way. However, now it is the router that plucks the data packets off the first subnet and forwards it to the destination station via the destination station's layer-3 subnet to which the router is also attached.

Numerous types of networks coexist in the data communications industry. In addition to ATM, there may be LANs, Wide Area Networks (WANs), and others. There is a need in the industry for interconnection between different network architectures and, in particular, users of preexisting LANs have a need to connect to emerging high speed network technologies, such as ATM. The need for incorporating or interfacing preexisting networks (more precisely subnetworks) into an ATM environment has led to the specification of several methodologies to support preexisting network architectures within ATM.

One such methodology is the emulated LAN (ELAN) which simulates classical LAN protocols in an ATM environment. (Classical LAN protocols, for example Ethernet and Token Rings, are referred to as legacy LANs.) The protocols that provide the specification for ELANs are called LAN emulation (LANE). Layer-3 protocols run on top of ELANs just as they do in legacy LANs. Hosts attached to the ELAN include emulation software that allows them to simulate legacy LAN end stations. Such hosts are called LAN Emulation Clients (LEC). The LEC software hides the ATM from the LAN protocols within the LEC device, and those protocols can utilize a LEC as if it were a legacy LAN. A LEC can also provide a standard LAN service interface in a LAN Switch that is usable to interface a legacy LAN with an ELAN.

Communication between LECs on an ELAN can be effected over the ATM. Each LEC has a physical, or Media Access Control (MAC) address associated with it, as well as an ATM address. For one LEC on a ELAN to communicate with another, it must obtain the ATM address of the destination LEC, given the destination MAC address. This address resolution is mediated through a LAN Emulation Server (LES). The source LEC issues a LANE Address Resolution Protocol Request (LE_ARP_Request) to the LES. Provided the destination station has previously registered its MAC address, ATM address pair with the LES serving the ELAN, the LES returns the ATM address of the destination to the requesting LEC in an ELAN Address Resolution Protocol Reply (LE_ARP_Reply). The source LEC can then use the ATM address to establish a connection to unicast data to the destination, a so-called data-direct Virtual Channel Connection (VCC), and transmit its data to the destination thereon.

LANEs are also specified for emulation of source routed LANs, for example Token Rings, as well as nonsource routed LANs, such as Ethernets. In source routed LANs, packets being sent to a destination station contain a Routing Information Field (RIF) that includes a path from source to destination that is an ordered set of route descriptors, ring and bridge numbers, forming the route between source and destination station. Operations performed on MAC address described hereinabove are correspondingly performed on the RIF in a source routed ELAN.

In the source-route bridged network, a source routed frame contains a RIF. The RIF includes an ordered list of ring and bridge numbers through which the frames are to pass from the source station to the destination station. Typically, the source station determines the route to the destination station by broadcasting an explorer frame. Bridges add the routing information to the RIF before forwarding the explorer frame. When the explorer frame reaches the destination, the destination station sends a response to the source station. The response contains the complete RIF that the source station then includes in subsequent frames addressed to that destination. Bridges make frame forwarding decisions based on the RIF.

Source routed LAN stations are connected to edge devices, for example LAN bridges, that bridge traffic between the legacy LAN ports and ELAN ports on the switched ATM network. However, traffic is still routed via the source routed path specified in the RIF, because the bridge does not have the information it needs in order to establish direct layer-2 ATM connections.

In order for a network employing source route bridging to take advantage of the speed and efficiency associated with route switching, there is a need in the art for a mechanism to enable source-route bridged networks to participate in route switched networks.

SUMMARY OF THE INVENTION

The previously mentioned needs are addressed by the present invention, which enables a source-route bridged network to participate in a route switched network by incorporating a route resolution protocol in the network infrastructure. Route resolution client functionality is provided in the source station on a source-route bridged network. A route resolution request, issued by the source station, is used to determine the Media Access Control (MAC) address and the RIF associated with the layer-3 protocol address of the destination station.

The source station then uses the supplied MAC address as the destination MAC address of frames bound for the associated layer-3 protocol address. It also includes the supplied RIF in each of the frames sent to the destination.

The frames bound for the destination MAC address are then delivered using the normal layer-2 procedures. This is accomplished by binding the layer-2, ATM, address associated with the destination MAC address to a virtual next-hop route descriptor that is embedded in the RIF included in each of the frames bound for the destination station. Consequently, the LEC associated with the ingress port of the source-route bridged network receives the ATM address of the edge device associated with the destination in response to its LE_ARP_Request. A data-direct virtual channel connection (VCC) is then established, and frames bound for the destination MAC address are delivered using normal layer-2 procedures.

In a network having shortcut bridge connectivity between layer-3 subnets, there is no need to introduce a virtual route descriptor bound to the ATM address associated with the destination MAC. The shortcut bridge functionality enables the ELAN segments in different layer-3 subnets to appear as one collection or "super-ELAN." The collection functions as a single ring and the associated ring number plays the role of the virtual route descriptor discussed above. Thus, the next-hop route descriptor in the merged RIF that is passed in the frame addressed to the destination MAC address is associated with the egress edge device, and that device's ATM address is provided in the LE_ARP_Response. The data frames are then passed using normal layer-2 procedures as before.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 schematically depicts the International Standards Organization (ISO) Reference Model of Open System Interconnection in accordance with the prior art.

DETAILED DESCRIPTION

Figure 2:
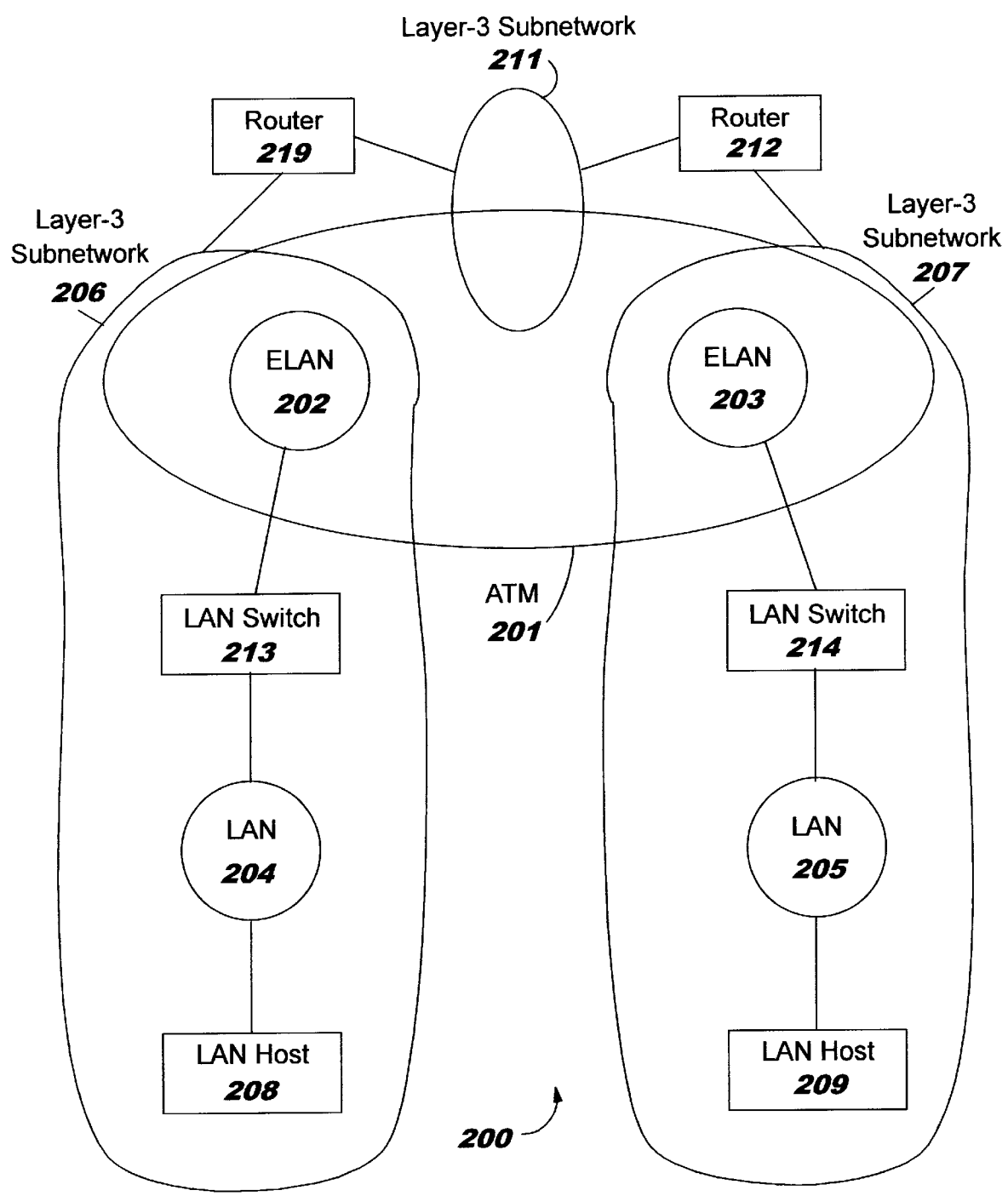
FIG. 2 illustrates a data processing network according to the prior art.

In the following description, numerous descriptive details are set forth to provide a thorough understanding of the present invention. However, it will be obvious to those skilled in the art that the present invention may be practiced without such specific details.

Refer now to the drawings wherein depicted elements are not necessarily shown to scale and wherein like or similar elements are designated by the same reference numeral through the several views.

Refer first to FIG. 2 in which is depicted an embodiment of a data processing network 200 according to the prior art. Data processing network 200 includes an ATM network 201 in which are embedded ELAN 202 and ELAN 203. Data processing network 200 also includes source-routed networks, LAN 204 and LAN 205. Communication between LAN hosts resident on LAN 204 and LAN hosts resident on LAN 205 must proceed through layer-3 protocols.

LAN 204 is included in Layer-3 Subnetwork 206 and LAN 205 is included in Layer-3 Subnetwork 207. For example, traffic bound from LAN Host 208, residing on LAN 204, and destined for LAN Host 209, residing on LAN 205, must be forwarded twice, or make two "hops," first through Router 210 between Layer-3 20 Subnetwork 206 and Layer-3 Subnetwork 211, and the second hop through Router 212 between Layer-3 Subnetwork 211 and Layer-3 Subnetwork 207. Thus, all traffic from LAN Host 208 bound for LAN Host 209, and conversely, must pass through Router 210 and Router 212. Although LAN 204 has connectivity to ELAN 202 via LAN Switch 213 and LAN 205 has connectivity to ELAN 203 via LAN Switch 214, LAN 204 and LAN 205 cannot exploit those layer-2 connections because the required layer-2 addresses are not contained in their source routed RIF.

The present invention alleviates the need for traffic flow through routers, such as Router 210 and Router 212 of FIG. 2, and permits source routed networks such as LAN 204 and LAN 205 in FIG. 2 to exploit the layer-2 connections of a route switched network, such as ATM 201 in FIG. 2.

Figure 3:
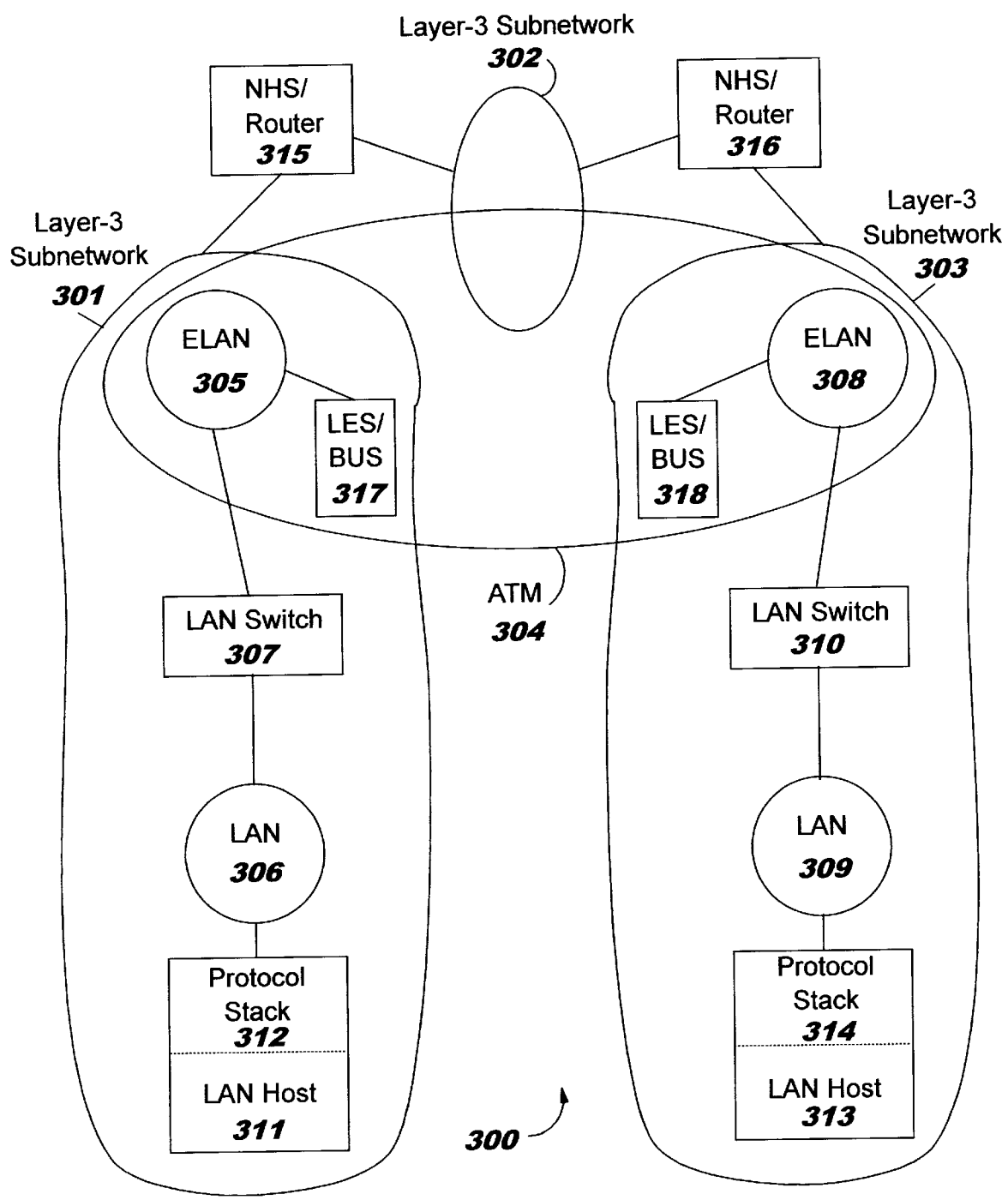
FIG. 3 illustrates a data processing network incorporating an embodiment of the present invention.

Refer now to FIG. 3 in which an embodiment of the present invention is depicted. FIG. 3 illustrates a data processing network 300 including Layer-3 Subnetwork 301, Layer-3 Subnetwork 302, Layer-3 Subnetwork 303, and ATM 304. ELAN 305, in ATM 304, is coupled to LAN 306 via LAN Switch 307. ELAN 305 and LAN 306 are resident in Layer-3 Subnetwork 301. Similarly, ELAN 308, in ATM 304, is coupled to LAN 309 via LAN Switch 310. ELAN 308 and LAN 309 reside in Layer-3 Subnetwork 303. LAN Host 311, which is resident in LAN 306, includes Protocol Stack 312. Incorporated in Protocol Stack 312 is a route resolution protocol. Similarly, LAN Host 313 includes Protocol Stack 314 that also incorporates route resolution protocol client functionality. Incorporated in the routed connectivity between layer-3 subnetworks is a Next Hop Server (NHS) that provides the functionality to service route resolution requests that are issued by a LAN host executing instructions implementing the route resolution protocol. Thus, Layer-3 Subnetwork 301 and Layer-3 Subnetwork 302 are connected by NHS/Router 315 and Layer-3 Subnetwork 302 is connected to Layer-3 Subnetwork 303 by NHS/Router 316.

In the embodiment of the present invention of FIG. 3, route resolution protocol client functionality is incorporated in Protocol Stack 314 within LAN Host 313. This enables that embodiment to operate symmetrically, as subsequently discussed. However, an alternative embodiment of the present invention need not operate symmetrically.

The route resolution capability embedded in data processing network 300 enables the source routed infrastructure in Layer-3 Subnetwork 301 and Layer-3 Subnetwork 303 to communicate via the layer-2 connections of ATM network 304. If LAN Host 311 in Layer-3 Subnetwork 301 wishes to send traffic to LAN Host 313 in Layer-3 Subnetwork 303, the route resolution client functionality in Protocol Stack 312 causes a route resolution request to be issued to determine the MAC address and RIF associated with LAN Host 313. The route resolution request proceeds toward LAN Host 313 via layer-3 protocols.

On receipt of the route resolution request, NHS/Router 316 acquires the MAC and ATM address associated with LAN Host 313. NHS/Router 316 performs an ARP for the MAC address associated with LAN Host 313, and a LE_ARP for the ATM address associated with LAN Host 313 in response to the route resolution request. These protocols cause, respectively, an ARP_Request and a LE_ARP_Request to be issued. In response to these requests, NHS/Router 316 receives the MAC address, ATM address, and RIF associated with the destination, LAN Host 313. The MAC address and ATM address along with the RIF from NHS/Router 316 to the destination station, LAN Host 313, are returned by NHS/Router 316 to NHS/Router 315. NHS/Router 315 then incorporates this MAC address and ATM address in its response to the route resolution request.

NHS/Router 315 also builds a merged RIF. NHS/Router 315 merges the RIF it received from NHS/Router 316 with the RIF from the source station, LAN Host 311, to NHS/Router 315, by creating a "virtual" route descriptor to join the two route segments. The virtual route descriptor does not correspond to a physical ring or bridge, but provides a link between RIF segments which do. The merged RIF is returned by NHS/Router 315 in its route resolution reply along with the MAC and ATM addresses associated with LAN Host 313 that it received from NHS/Router 316.

However, prior to returning its route resolution reply, NHS/Router 215 registers the virtual route descriptor that it created to merge the two route segments with LES/BUS 317 attached to ELAN 305. This registration binds the ATM address associated with LAN Host 313 to the virtual route descriptor. LAN Host 311 receives the destination MAC address and the associated RIF returned by NHS/Router 315 through its route resolution client functionality embedded in Protocol Stack 312.

Alternative embodiments of the present invention may be implemented in an ATM attached host running LAN emulation. Although the embodiment of the present invention depicted in FIG. 3 includes LAN Host 311 and LAN Host 313 having ATM connectivity via LAN Switch 307 and LAN Switch 310 respectively, the present invention operates in exactly the same fashion in an ATM attached host running LAN emulation.

Figure 4:
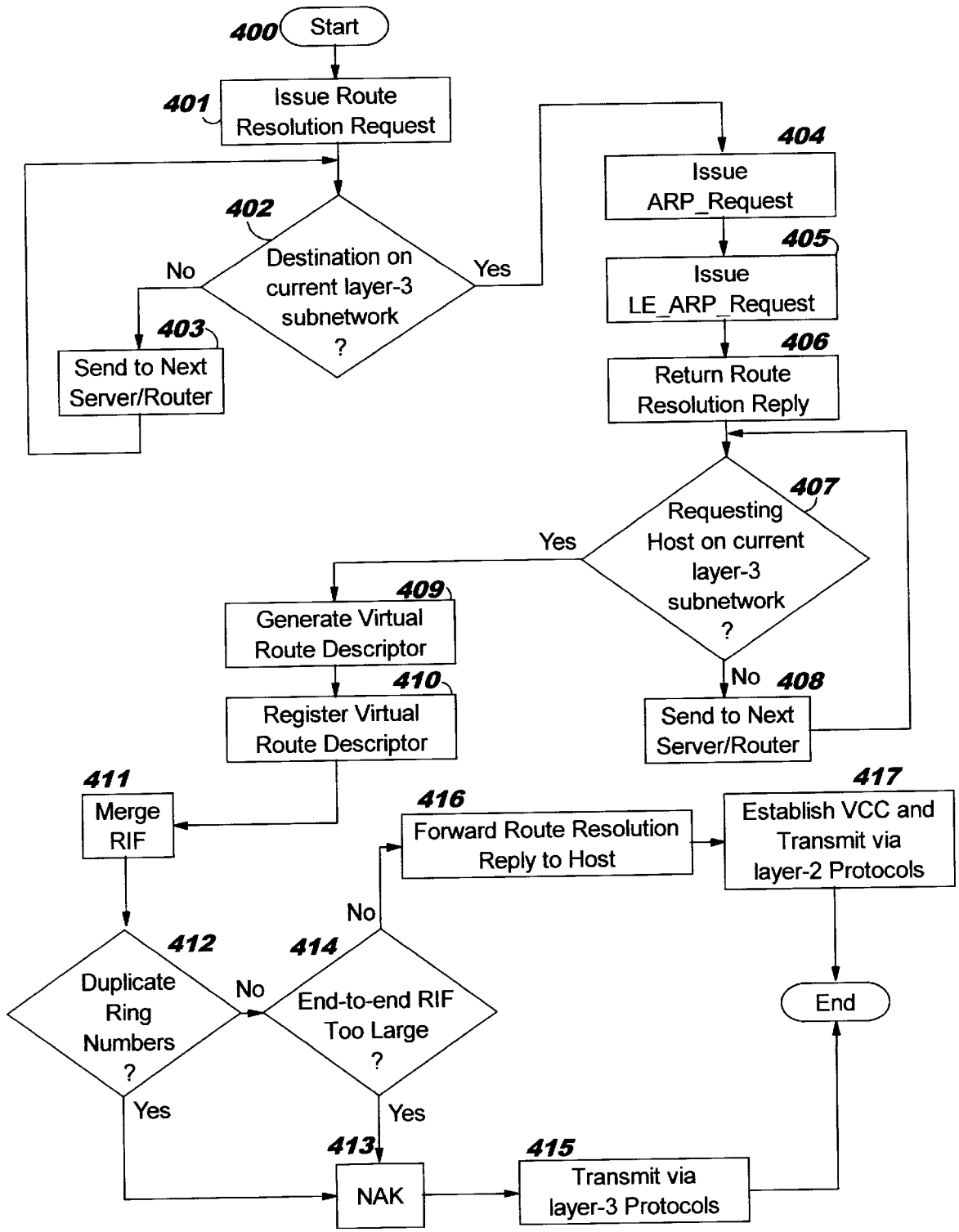
FIG. 4 illustrates a flow diagram in accordance with a method of an embodiment of the present invention.

The method of the invention may be further understood by referring to FIG. 4, where a flow chart depicting the steps of the method are illustrated. The method initiates with data bound for a destination residing on a layer-3 subnetwork different than that of the source host. The process begins at step 400. The source host, for example, LAN 311, through its embedded route resolution protocol, issues a route resolution request in step 401. The route resolution request is forwarded toward the destination via layer-3 protocols. At initiation, only the layer-3 address of the destination is known to the source host.

Route resolution service functionality is embedded in layer-3 routers which span the layer-3 route between source and destination. Such routers have the capability of servicing route resolution requests. On receipt of a route resolution request packet, a layer-3 router incorporating route resolution service functionality, that is, an NHS, must determine whether the destination is on the layer-3 network on which it resides (step 402). In other words, the NHS must determine if it is an egress server. If it is not an egress server, the current NHS sends the route resolution request to the next NHS along the layer-3 route in step 403. If the current NHS is an egress server, for example, NHS/Router 316, it ascertains the layer-2 addresses associated with the destination. It issues an ARP_Request in step 404, and receives the MAC address and RIF associated with the destination in response. It then issues an LE_ARP_Request in step 405 to obtain the ATM address associated with the destination. The destination-associated ATM address, MAC address, and RIF are included in resolution reply route packets. The egress server returns the route resolution reply to the requesting host, for example LAN Host 311, via layer-3 routing in step 406. The NHS receiving the route resolution reply determines in step 407 if the reply is a response to a request for which it was the ingress NHS. If not, it sends the route resolution reply on in step 408. The first NHS to receive a route resolution request from a legacy LAN client is termed an ingress server. In the embodiment of the present invention illustrated in FIG. 3, NHS/Router 315 is an ingress server with respect to traffic from LAN Host 311. In step 409 the ingress NHS generates a virtual route descriptor. It then registers the virtual route descriptor with an LES on the ingress ELAN, for example LES/BUS 317 on ELAN 305 (step 410). The registration binds the virtual route descriptor with the destination-associated ATM address. The ingress NHS then merges the ingress RIF with the RIF received in the route resolution reply request in step 411. The merging of the RIF segments is done through the intermediation of the virtual route descriptor.

While constructing the merged RIF, the ingress NHS must perform two validity checks. The route descriptor contains a ring number and a bridge number. The end-to-end RIF consists of a ordered set of ring numbers and bridge numbers. The ingress NHS must check that the end-to-end RIF does not contain duplicate ring numbers (step 412). If this test fails, then the ingress NHS server returns a negative acknowledgment (NAK) in step 413. If not, it then checks that the end-to-end RIF does not exceed a predetermined maximum RIF length in step 414. If the end-to-end RIF is too large, the ingress NHS returns an NAK in step 413. Otherwise, it returns the route resolution reply, containing the merged RIF, to the requesting host in step 416. The requesting host then uses the layer-2 addresses to send its data packets in step 417. In the event of a failure, the source routed network, such as LAN 306 and LAN 309, are unable to participate in the route switch network, such as ATM 304, and the requesting host transmits its data to the destination host using layer-3 protocols in step 415.

An embodiment of the present invention may be implemented with the Next Hop Resolution Protocol (NHRP). NHRP is part of the specification for Multiprotocol Over ATM, version 1.0. NHRP is Annex C, ATM Forum, AF-MPOA-0087.000, July 1997, which is hereby incorporated herein by reference.

If the acquisition of an ATM path is successful, data frames bound for LAN Host 313 from LAN Host 311 are then delivered via normal layer-2 procedures. Using its route resolution client functionality, LAN Host 311 transmits the data frames bound for LAN Host 313 using the MAC address of LAN Host 313 that it received by the previously described process, in accordance with step 417. It also includes the RIF obtained at the same time. In response, LAN Switch 307, acting as a source route bridge, issues an LE_ARP_Request for the next-hop route descriptor. This is the virtual route descriptor embedded in the merged RIF. LES/BUS 317 recognizes the virtual route descriptor by virtue of its prior registration and returns the ATM address associated with LAN Host 313 that is bound to the virtual route descriptor. LAN Switch 307 then sets up a data-direct VCC to the ATM associated with LAN Host 313, namely, the ATM address of LAN Switch 310. The data frames bound for LAN Host 313 are then delivered over this so-called shortcut VCC.

It would be understood by an artisan of ordinary skill that traffic initiated by LAN Host 313 bound for a destination on LAN 306 would proceed by the same process. In such a case NHS/Router 315 would then be the egress router and NHS/Router 316 the ingress router. The virtual route descriptor binding the ATM address associated with the destination with the RIF would be registered with the LES/BUS 318.

Figure 5:
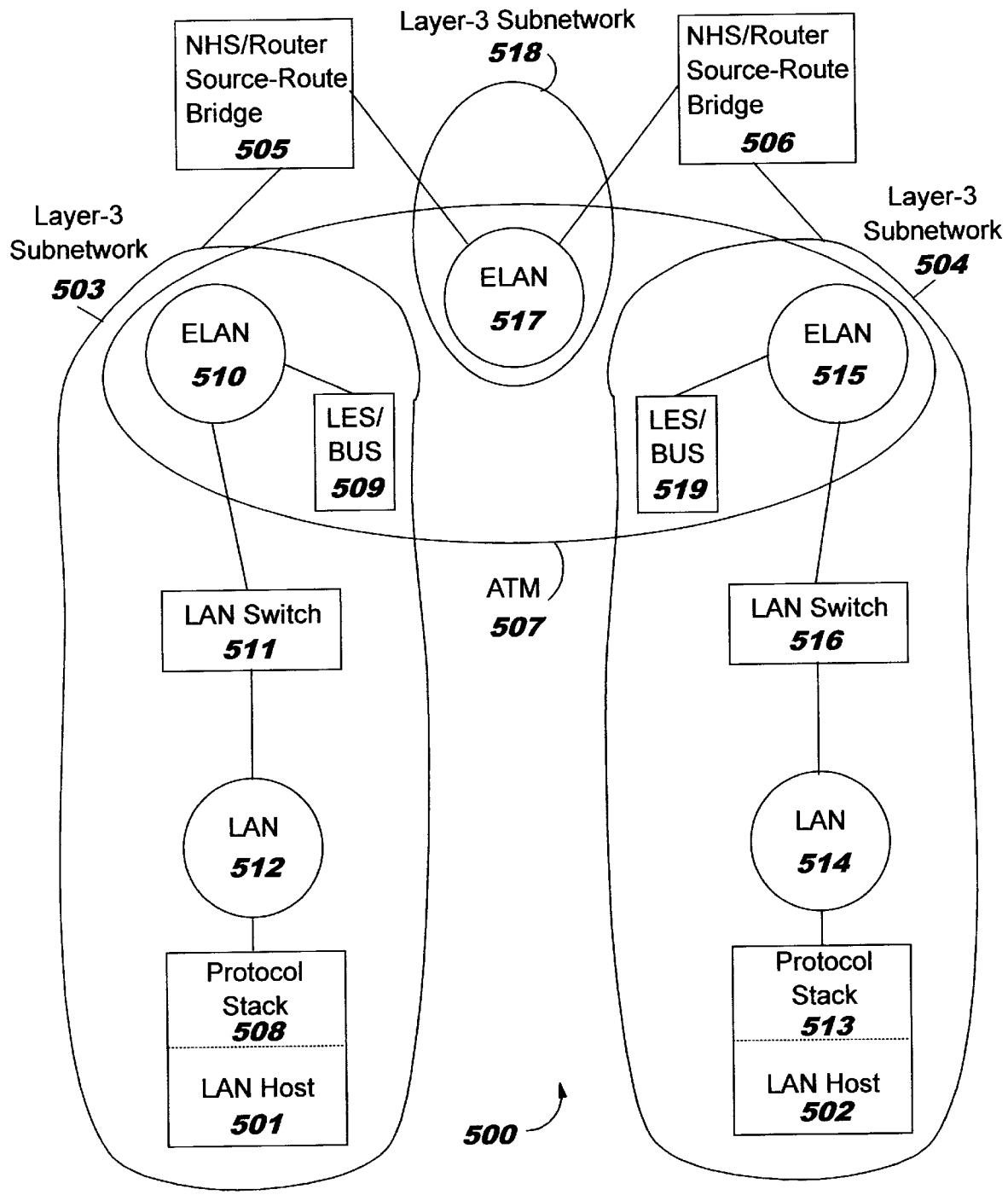
FIG. 5 illustrates a data processing network incorporating an alternative embodiment of the present invention.

The present invention is also adaptable to a data processing network having source-route bridge connectivity between the participating stations in different layer-3 subnetworks. Refer now to FIG. 5 in which is depicted a data processing network 500 having source-route bridge connectivity between LAN Host 501 and LAN Host 502 residing in layer-3 subnetwork 503 and layer-3 subnetwork 504, respectively. Such networks can forward data using the route descriptors in the RIF without reference to layer-3 protocols. A source station, such as LAN Host 501 seeking to transmit data to a destination station such as LAN Host 502, may obtain end-to-end routing by broadcasting an explorer frame to obtain a RIF. LAN Host 501 then transmits its data frames which contain the end-to-end RIF returned by explorer frame. In transporting each data packet from LAN Host 501 to LAN Host 502, NHS/Router/Source-bridge 505 and NHS/Router/Source-bridge 506 make frame forwarding decisions based on the RIF. Although LAN Host 501 may obtain end-to-end routing in this way, it is unable to participate in the route switching infrastructure of ATM 507 without the ATM address associated with the destination, and therefore cannot take advantage of the efficiencies that such participation would offer.

Providing route resolution protocol client functionality in data processing network 500 enables a data-direct VCC to be established on behalf of a source station. The present invention operates within network 500 having source-route bridging in exactly the same way as it operates in a network having routed connectivity between participating stations, such as network 300 of FIG. 3. Route resolution client functionality embedded in protocol stack 508 of LAN Host 501 causes a route resolution request to be issued. This route resolution request is transmitted toward the destination via NHS/Router/Source-route Bridge 505 and NHS/Router/Source-route Bridge 506. Egress NHS/Router/Source-route Bridge 506 determines a MAC address and an ATM address associated with destination station, LAN Host 502. It also ascertains an egress segment RIF. NHS/Router/Source-route Bridge 506 provides this information to NHS/Router/Source-route Bridge 505 which merges the egress segment RIF with the ingress segment RIF through the intermediation of a virtual route descriptor, as previously described. NHS/Router/Source-route Bridge 505 registers the virtual route descriptor that it created with LES/BUS 509 on ELAN 510 and transmits the route resolution reply containing the MAC address associated with a destination station and merged RIF to the source station, LAN Host 501. LAN Host 501 then uses this MAC address and RIF when transmitting data frames to the destination station, LAN Host 502. LAN Switch 511, acting as a bridge between ELAN 510 and LAN 512, then sets up a data-direct VCC to the ATM address associated with LAN Host 502 which it receives in response to an LE_ARP_Request as described hereinabove. The frames destined for LAN Host 502 are then delivered over this data-direct VCC.

In an embodiment of the present invention, the route resolution protocol may be NHRP.

Similarly, data to be transmitted from LAN Host 502 destined for LAN Host 501 may be delivered using normal layer-2 procedures via ATM 507 using the process hereinabove described. The route client finctionality contained in data processing network 500 may operate in symmetric fashion, although it need not necessarily do so. In such an embodiment, LAN Host 502 contains route client functionality in Protocol Stack 513. LAN Host 502 resides on LAN 514 having connectivity to ELAN 515 through LAN Switch 516. NHS/Router/Source-route Bridge 506 provides connectivity between ELAN 515 and ELAN 517 which is in Layer-3 Subnetwork 518. ELAN 517 is also connected to NHS/Router/Source-route Bridge 505. With respect to data being transmitted from LAN Host 502 and destined for LAN Host 501, NHS/router 505 is the egress route resolution server, NHS/router 506 is the ingress route resolution server, and the virtual route descriptor is registered with LES/BUS 519 on ELAN 515. The data is transmitted using normal layer-2 procedures in a fashion symmetric to that described hereinabove with respect to data transmitted from LAN Host 501 to LAN Host 502.

Figure 6:
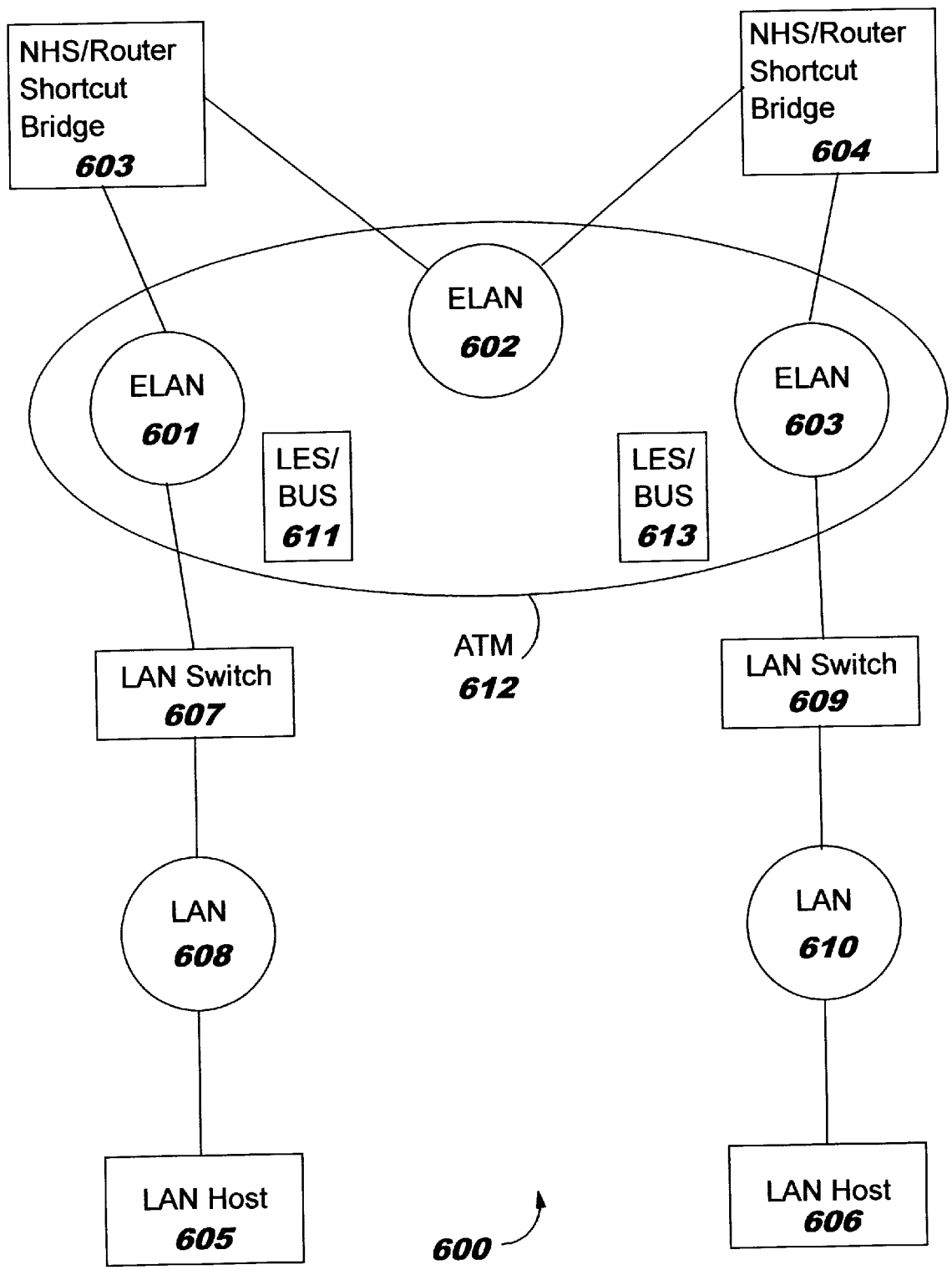
FIG. 6 illustrates a data processing network incorporating another alternative embodiment of the present invention.

In a network having shortcut bridged connectivity between participating stations, the method of the present invention operates without the creation of a virtual route descriptor. Refer now to FIG. 6 in which an embodiment of such a network is depicted. The capabilities of a shortcut bridge enable it to use the destination MAC address rather than the RIF to route frames bound for the destination host. This enables each of the ELAN segments, ELAN 601, ELAN 602, and ELAN 603 to appear as one collection, or "super-ELAN." In the context of a source-routed frame, ELAN 601, ELAN 602, and ELAN 603 function as a single ring, and their associated route descriptor in the RIF is associated with a single ring number. Consequently, although ingress segment RIFs and egress segment RIFs must still be merged in the present invention, there is no need to introduce virtual route descriptors. Consequently, no step of registration of route descriptors is needed, either.

In a network having shortcut bridged connectivity between participating stations, such as network 600 of FIG. 6, ingress RIF segments and egress RIF segments are linked at the common ring number associated with each of the ELAN segments, ELAN 601, ELAN 602, and ELAN 603. This common ring number appears as the last ring number in the ordered set of route descriptors in the ingress RIF and the first ring number in the ordered set of route descriptors in the egress RIF. The merged RIF may be viewed as the set-theoretic union of the ingress RIF and the egress RIF, with the common ring number thereby appearing in the ordered set of route descriptors only once. As described previously, the egress RIF is provided by NHS/Router/Shortcut Bridge 604 to NHS/Router/Shortcut Bridge 603 in a route resolution reply issued in response to a route resolution request initiated by LAN Host 605. NHS/Router/Shortcut Bridge 603 merges the ingress and egress RIFs and returns them to LAN Host 605 in a route resolution reply as described hereinabove. The MAC address associated with a destination, here LAN Host 606, is also returned in the route resolution reply as previously discussed. In an embodiment of the present invention, the route resolution protocol may be the NHRP.

When LAN Host 605 seeks to transmit data to LAN Host 606, it uses the merged RIF and the MAC address associated with LAN Host 606 when transmitting frames to LAN Host 606. However, now when LAN Switch 607, bridging LAN 608, issues an LE_ARP_Request for the next-hop route descriptor, the normal shortcut bridge mechanisms return the ATM address associated with the destination host, LAN Host 606, the ATM address of LAN Switch 609, bridging LAN 610. The normal LE ARP mechanisms also bind the common ring number associated with ELAN 601, ELAN 602 and ELAN 603 with that ATM address. LAN Switch 607 then uses the ATM address of LAN Switch 609 to establish a data-direct VCC over ATM 612, and the data packets destined for LAN Host 606 are transmitted over this VCC.

In symmetric fashion, LAN Host 606 can participate in the route-switched network, ATM 612, to transmit data bound for LAN Host 605. In this instance, LAN Switch 609 uses the ATM address of LAN Switch 607 to establish the VCC. The merged RIF associated with the establishment of this data path is the "mirror" image of that related to data flow from LAN Host 605 to LAN Host 606, previously described.

Figure 7:
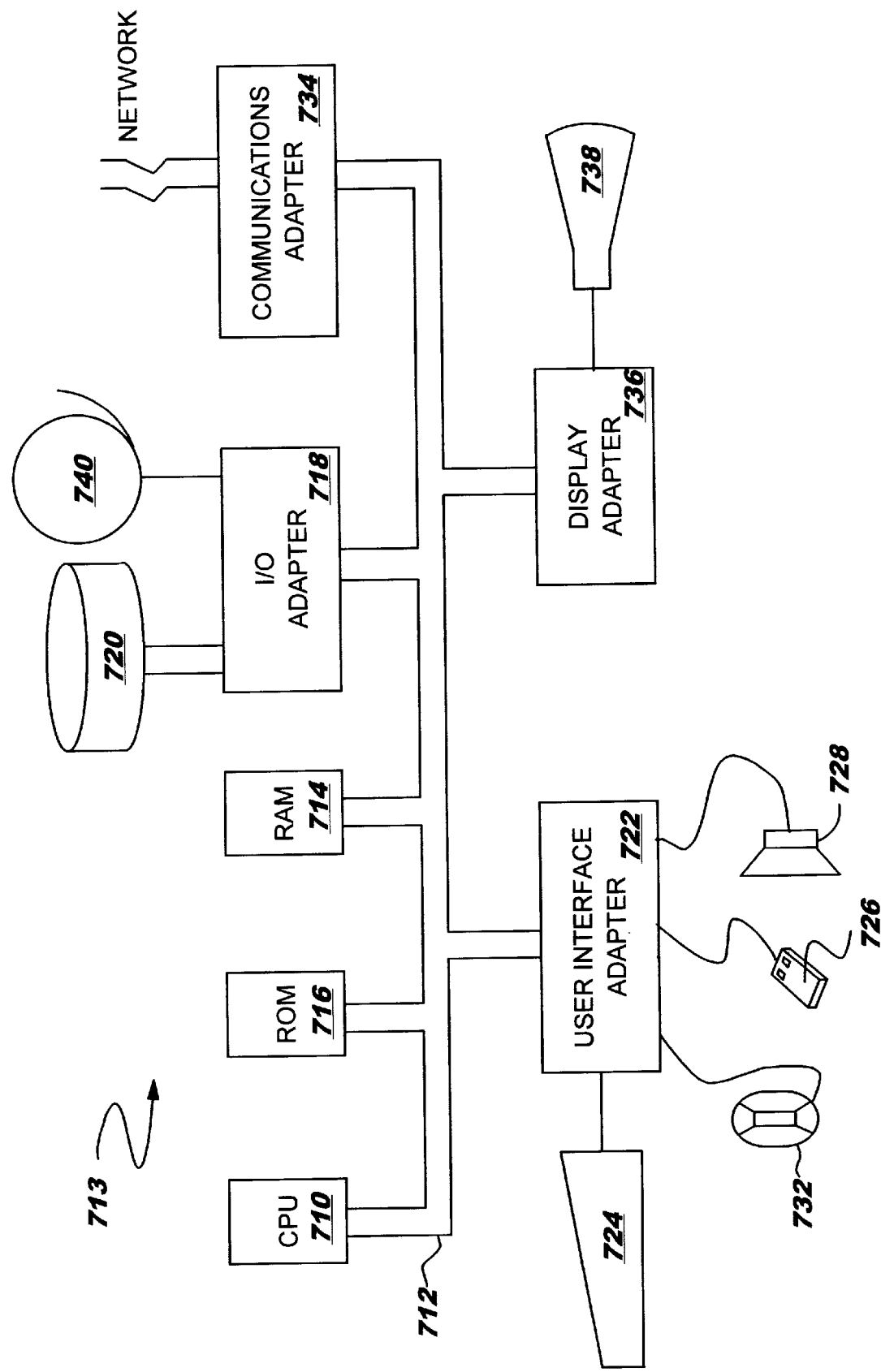
FIG. 7 illustrates a data processing system configured in accordance with the present invention.

In an embodiment of the present invention, a LAN Host, such as LAN Host 311 or LAN Host 313 of FIG. 3, may be a workstation. A representative hardware environment for practicing the present invention in such an embodiment is depicted in FIG. 7, which illustrates a typical hardware configuration of workstation 713 in accordance with the subject invention having central processing unit (CPU) 710, such as a conventional microprocessor, and a number of other units interconnected via system bus 712. Workstation 713 includes random access memory (RAM) 714, read only memory (ROM) 716, and input/output (I/O) adapter 718 for connecting peripheral devices such as disk units 720 and tape drives 740 to bus 712, user interface adapter 722 for connecting keyboard 724, mouse 726, speaker 728, microphone 732, and/or other user interface devices such as a touch screen device (not shown) to bus 712, communication adapter 732 for connecting workstation 713 to a data processing network, and display adapter 736 for connecting bus 712 to display device 738. CPU 710 may include other circuitry not shown herein, which will include circuitry commonly found within a microprocessor, e.g., execution unit, bus interface unit, arithmetic logic unit, etc. CPU 710 may also reside on a single integrated circuit.

In one embodiment, a protocol stack, for example, Protocol Stack 312 of FIG. 3 may be stored in ROM 716. In an alternative embodiment it may be located in a mass storage device, such as disk units 720. If an application being executed on workstation 713 seeks to transmit data to another LAN Host residing on a different layer-3 subnetwork, for example, LAN Host 313 of FIG. 3, an instruction set implementing the route resolution protocol within the protocol stack would be loaded into RAM 714 from ROM 716 or disk units 720, as appropriate. CPU 710 would then execute the instruction set in order to perform those steps of the route resolution protocol that are within its scope. These steps would include steps 401and 417 of FIG. 4.

Although the present invention and its advantages have been described in detail, it should be understood that various changes, substitutions and alterations can be made herein without departing from the spirit and scope of the invention as defined by the appended claims.

What is claimed is:

1. A method comprising the steps of:

issuing a route resolution request from a route resolution protocol client residing in a data processing device of a first ISO layer-3 subnetwork in response to communication with a destination host of a second ISO layer-3 subnetwork communicating with said first ISO layer-3 subnetwork through one or more routers and forwarding said route resolution request toward said destination host, such forwarding comprising the steps of:

determining if a current router of said one or more of routers connects to said second layer-3 subnetwork, and sending said route resolution request to a next router of said one or more routers toward said destination host when said current router does not connect to said second layer-3 subnetwork:

obtaining a Media Access Control (MAC) address, ATM address and a Route Information Field (RIF) segment associated with said destination host in response, to said route resolution request by a route resolution protocol server residing in one or more routers connecting a plurality of ISO layer-3 subnetworks, said first ISO layer-3 subnetwork and said second ISO layer-3 subnetwork being among said plurality of ISO layer-3 subnetworks, the step of obtaining comprising the steps of:

responding to said route resolution request by determining a MAC address and an ATM address associated with said destination host by an egress route resolution protocol server, said egress route resolution protocol server being a route resolution protocol server of a router attached to said second ISO layer-3 subnetwork, said last-mentioned router attached to said second ISO layer-3 subnetwork being among said one or more routers:

sending an route resolution reply in one or more route resolution packets to said route resolution protocol client by said egress route resolution protocol server, said route resolution reply including said MAC address, said ATM address and a RIF segment associated with said destination host, and forwarding said route resolution reply toward said route resolution client. such forwarding comprising the steps of:
   determining if a current router of said one or more routers, connects to said first layer-3 subnetwork; and
   sending said route resolution reply to a next router of said one or more routers toward said route resolution client when said current router does not connect to said first layer-3 subnetwork; generating a virtual route descriptor:

merging a RIF segment associated with said route resolution client with a RIF segment including said RIF segment associated with said destination host and interposing said virtual route descriptor between said RIF segment associated with said route resolution client and said RIF segment containing said RIF segment associated with said destination host included in said route resolution reply;

registering said generated virtual route descriptor with a data processing device in said first ISO layer-3 subnetwork, and binding said virtual route descriptor with said ATM address; and sending to said destination host one or more data packets which include said MAC address by establishing a Virtual Channel Connection (VCC) by a LAN Switch coupled to a first ELAN to a device attached to a second ELAN wherein said second ELAN is in said second ISO layer-3 subnetwork, the step of establishing a VCC comprising the steps of:
   issuing an Emulated LAN Address Resolution Protocol request (LE_ARP_Request) by said LAN Switch in response to said data packets including said MAC address;
   creating a data-direct VCC to said ATM address associated with said destination host, said ATM address being received in response to said LE_ARP_Request by said LAN Switch; and transmitting said one or more data packets to said ATM address via said data-direct VCC.

2. The method of claim 1 wherein said LAN Switch is an ATM bridge.

3. The method of claim 1 wherein said route resolution protocol is a Next Hop Resolution Protocol (NHRP), wherein said route resolution request is an NHRP Resolution Request, said NHRP Resolution Request comprising one or more NHRP Resolution Request packets, wherein said route resolution reply is an NHRP Resolution Reply, said NHRP Resolution Reply comprising one or more NHRP Resolution Reply packets, wherein said route resolution client is an NHRP client, wherein said route resolution server is an NHRP server, and wherein said data processing device in said first ISO layer-3 subnetwork is a LAN Emulation Server (LES) connected to said first ELAN.

4. In an Asynchronous Transfer Mode (ATM) data processing network, a method of source routing comprising the steps of:
   providing a route resolution protocol client in a LAN Host of a first ISO layer-3 subnetwork which defines a route resolution request in accordance with a route resolution protocol, said route resolution requestl seeking to obtain an ATM address and a Media Access Control (MAC) address of a destination host of a second layer-3 subnetwork in a route resolution reply defined by said route resolution protocol;

providing a route resolution protocol server in a plurality of routers connecting a plurality of ISO layer-3 subnetworks, said first ISO layer-3 subnetwork being among said plurality of ISO layer-3 subnetworks, and wherein a second ISO layer-3 subnetwork among said plurality of ISO layer-3 subnetworks is an ISO layer-3 subnetwork of a destination host;

issuing said route resolution request from said route resolution protocol client in response to an initiation of a first data packet for said destination host, said step of issuing said route resolution request further comprising the steps of:
   determining if a current router of said plurality of routers connects to said second layer-3 subnetwork; and
   sending said route resolution request to a next router of said plurality of routers toward said destination host when said current router does not connect to said second layer-3 subnetwork;

responding to said route resolution request by determining a MAC address and an ATM address associated with said destination host by an egress route resolution protocol server, said egress route resolution protocol server being a route resolution protocol server of a router attached to said second ISO layer-3 subnetwork and among said plurality of routers, said step of determining further comprising steps of:
   issuing an Address Resolution Protocol (ARP) request; and
   issuing an Emulated LAN Address Resolution Protocol (LE_ARP) request;

sending a route resolution reply in one or more route resolution packets to said route resolution protocol client from said egress route resolution protocol server, said route resolution reply including said MAC address, said ATM address; and a RIF segment associated with said destination host, said step of sending a route resolution reply further comprising the steps of:
   determining if a current router of said plurality of routers connects to said first layer-3 subnetwork; and
   sending said route resolution reply to a next router of said plurality of routers toward said route resolution client when said current router does not connect to said first layer-3 subnetwork;

generating a virtual route descriptor;

merging a RIF segment associated with said route resolution client with a RIF included in said route resolution reply, said RIF including said RIF segment associated with said destination host, said step of merging a RIF segment associated with said route resolution client further comprising interposing said virtual route descriptor between said RIF segment associated with said route resolution client and said RIF included in said route resolution reply;

registering [a] said virtual route descriptor with a LAN Emulation Server/Broadcast and Unknown Server (LES/BUS), said LES/BUS being attached to a first ELAN in said first ISO layer-3 subnetwork, wherein said step of registering binds said virtual route descriptor with said ATM address; and establishing a Virtual Channel Connection (VCC) by a LAN Switch coupled to said first ELAN to a device attached to a second ELAN wherein said second ELAN is in said second ISO layer-3 subnetwork, said step of establishing a VCC further comprising the steps of:

sending one or more data packets to said destination host by said route resolution protocol client, wherein said one or more data packets includes said MAC address of said destination host;

issuing an LE_ARP_Request by said LAN Switch in response to said MAC address;

creating a data-direct VCC to said ATM address associated with said destination host, said ATM address being received in response to said LE_ARP_Request by said LAN Switch; and sending said one or more data packets to said ATM address via said data-direct VCC.

5. A data processing system comprising:

(A) a first data processing device having
circuitry operable for attaching to a Local Area Network (LAN) which is resident in a first layer-3 subnetwork; and
circuitry for sending and receiving route resolution protocol packets;

(B) a second data processing device having
circuitry operable for attaching to said first layer-3 subnetwork and a second layer-3 subnetwork; and
circuitry for sending and receiving route resolution protocol packets;

(C) a third data processing device having
circuitry operable for attaching to said second layer-3 subnetwork and a third layer-3 subnetwork, and
circuitry for sending and receiving route resolution protocol packets. said route resolution protocol packets comprising a route resolution request packet and a route resolution reply packet, said route resolution reply packet, including one or more source-routed network route descriptors and layer-2, protocol addresses. said layer-2 protocol addresses being associated with a destination station;

(D) circuitry for generating a virtual route descriptor, wherein said second data processing device further has circuitry for merging a first route descriptor of said source-routed network route descriptors and a second route descriptor of said source-routed network route descriptors and which includes circuitry for merging a first route descriptor and a second route descriptor using said virtual route descriptor; and (E) a fourth data processing device in said first layer-3 subnetwork and having
circuitry for attachment to an ATM network;
and further wherein said second data processing device further has circuit for registering said layer-2 protocol address and said virtual route descriptor with said fourth data processing device.

6. The data processing system of claim 5 wherein said second data processing device further comprises circuitry for registering said layer-2 protocol addresses and said virtual route descriptor with a fourth data processing device, said fourth data processing device being operable for attachment to an ATM network, wherein said fourth data processing device is in said first layer-3 subnetwork.

7. The data processing system of claim 5 wherein said route resolution protocol is Next Hop Resolution Protocol (NHRP).

8. The data processing system of claim 5 wherein said third data processing device further comprises circuitry operable for acquiring said layer-2 protocol addresses associated with a destination station.

9. The data processing system of claim 8 wherein said second data processing device is an NHRP server.

10. The data processing system of claim 8 wherein said third data processing device is an NHRP server.

11. The data processing system of claim 8 wherein said first data processing device is a LAN host.

12. The data processing system of claim 8 wherein said fourth data processing device is an LAN Emulation Server (LES) attached to an emulated LAN (ELAN) within said first layer-3 subnetwork.

13. The data processing system of claim 5 wherein said third data processing device further comprises circuitry operable for acquiring said layer-2 protocol addresses associated with a destination station.

14. The data processing system of claim 5 wherein said route resolution protocol is NHRP.

15. The data processing system of claim 5 wherein said second data processing device is an NHRP server.

16. The data processing system of claim 5 wherein said third data processing device is an NHRP server.

17. The data processing system of claim 5 wherein said first data processing device is a LAN host.

18. The data processing system of claim 5 wherein said fourth data processing device is an LES attached to an ELAN within said first layer-3 subnetwork.

* * * * *